Aug. 12, 1969    H. L. BURGESS    3,460,614
PILOT VALVE AND MULTIPLE PILOT VALVE UNIT
Filed Feb. 20, 1967    3 Sheets-Sheet 1
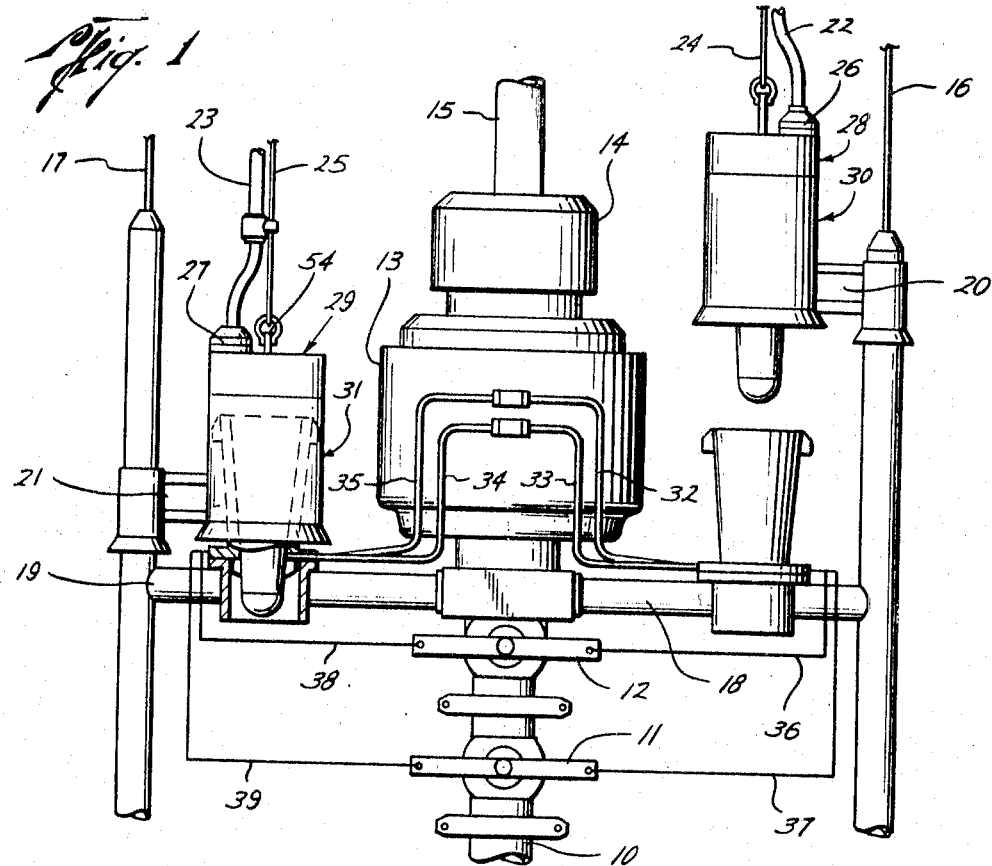
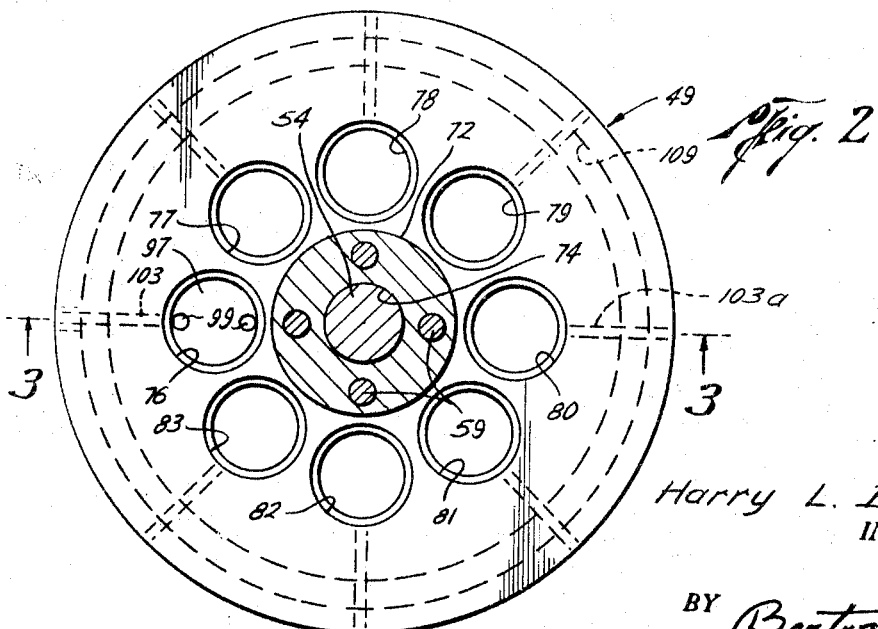
Harry L. Burgess
INVENTOR
BY Bertram H Mann
ATTORNEY

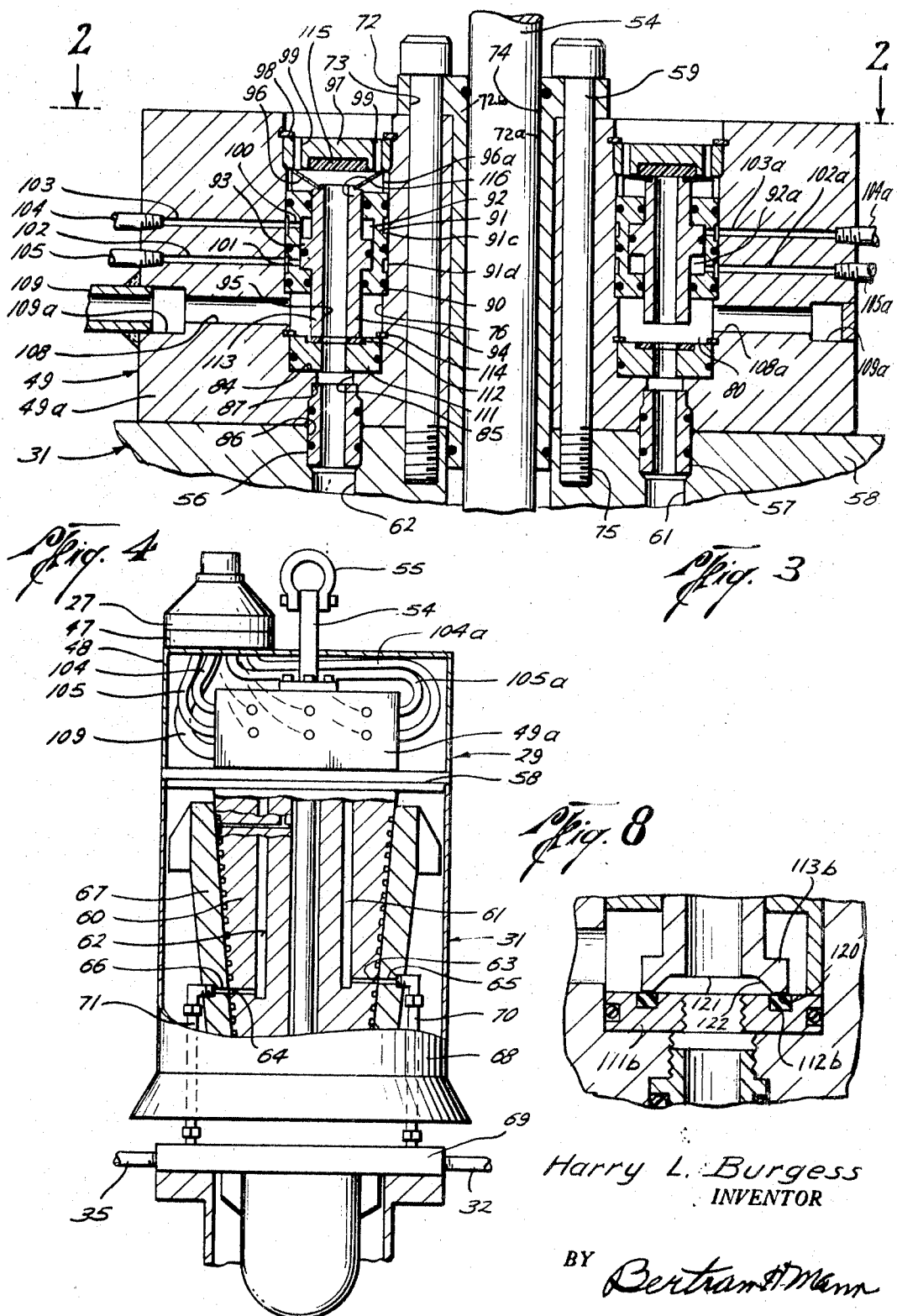

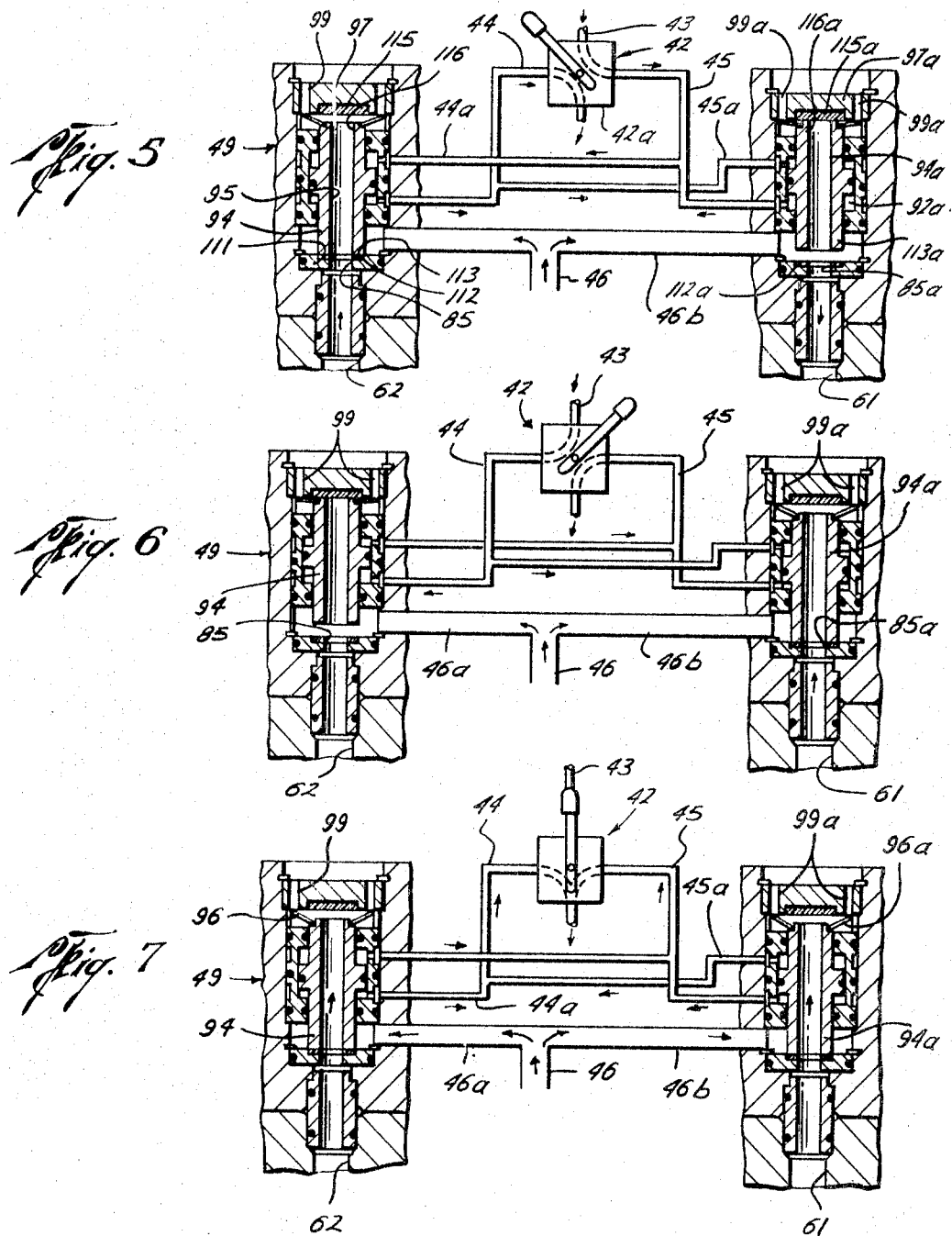

United States Patent Office 3,460,614
Patented Aug. 12, 1969

3,460,614
PILOT VALVE AND MULTIPLE PILOT
VALVE UNIT
Harry Lee Burgess, Houston, Tex., assignor to Hudson
Machine Works, Inc., Houston, Tex., a corporation of
Texas
Filed Feb. 20, 1967, Ser. No. 617,135
Int. Cl. E21b 33/035; F15b 13/04; F17d 3/00
U.S. Cl. 166—.6                                                7 Claims

ABSTRACT OF THE DISCLOSURE

A very rugged, compact, easily repaired multiple pilot valve unit is installed between the surface-controlled fluid lines and the fluid motors which operate subsurface wellhead instrumentalities, such as blowout preventers and the like. The unique pilot valve of the hollow slide valve type substantially eliminates shear seals which cause trouble in hydraulic systems.

RELATED APPLICATION

This invention is especially although not exclusively adapted for assembly and use with the retrievable hydraulic connector for sub-sea drilling systems disclosed in a copending application Ser. No. 439,719, filed Mar. 15, 1965 in the name of the present applicant, and now abandoned.

BACKGROUND OF THE INVENTION

Field of the invention

This invention relates to pilot valve constructions and multiple pilot valve units especially adapted for assembly and use with fluid-controlled sub-sea wellhead instrumentalities, such as blowout preventers and the like.

Prior art

Various mechanisms have been provided for connecting a bundle of control fluid line hoses to subsurface blowout preventer controls and the like in such a way that the connections can be broken and/or remade, if necessary. The above-mentioned copending application shows an exemplary form of retrievable, multiple hydraulic line connector for such control lines. Preferably, a single heavy operating pressure line is provided together with a pilot valve arrangement and pilot valve control lines whereby the operating pressure can be directed as required from a surface control panel to the fluid motors for actuating the different wellhead instrumentalities. Heretofore, the only pilot valve arrangement which has been available for use in this assembly has been a very large and complicated assembly which is quite difficult to inspect and repair. This assembly, for instance, projects three feet above the hydraulic line connector and, thus, well above the blowout preventer stack so as to be subject to being struck by units lowered to the wellhead.

SUMMARY OF THE INVENTION

The novel, multiple valve pilot unit is constructed of a body block having opposing end faces and a plurality of parallel valve chamber bores extending axially in the block. A liner bushing in each bore forms the operating chamber for a hollow, plunger-type slide valve, and an annular valve seat element is provided at both ends of each valve. Cooperating valve seats are provided at the ends of each valve chamber. These valve seat elements control the supply of operating fluid to a particular fluid motor and the exhausting thereof. The bushings and valves are secured in position by detachable closure plugs which can be easily removed to install or withdraw the valve for inspection, repair, or replacement. Where the pilot valve unit is used with a retrievable hydraulic line connector as covered in the above-mentioned copending application, the pilot valve assembly and the hose line bundle connector, in case of necessity, may be withdrawn with the spear or stinger part of the connector.

BRIEF DESCRIPTION OF THE DRAWINGS

In the accompanying drawings which illustrate the invention,

FIG. 1 is a schematic elevation illustrating portions of a sub-sea wellhead assembly showing the novel pilot valve unit applied thereto;

FIG. 2 is a plan view of the novel pilot valve unit and is taken substantially on line 2—2 of FIG. 3;

FIG. 3 is an enlarged vertical transverse section through the pilot valve unit taken substantially on line 3—3 of FIG. 2;

FIG. 4 is an elevation partly cut away and sectioned showing the manner of assembling the novel pilot valve unit with a retrievable fluid line connector, as described in the above-mentioned copending application, and a hose bundle connector;

FIGS. 5, 6, and 7 are diagrammatic representations illustrating the operation of a correlated pair of pilot valves in the novel unit; and FIG. 8 is a detail view of a modification.

DESCRIPTION OF THE PREFERRED EMBODIMENTS

FIG. 1 shows the upper portion 10 of a well casing head to which are secured a pair of plunger-type blowout preventers 11 and 12, an annular seal-type blowout preventer 13, and a collet connector 14 for securing the conductor pipe 15 to the wellhead stack. All of the above are well-known and need not be further described. Guidelines 16 and 17 extend from a surface platform or vessel to an anchorage at the water bottom, and various wellhead instrumentalities are slidably secured to these cables, as by means of attachment elements 18, 19, 20, and 21. A pair of hose bundles extend downwardly between cables 16 and 17, as at 22 and 23, these being supported by cables 24 and 25. The hose bundle cables terminate in connector units 26 and 27 and cables 24 and 25 and the connector units are connected to pilot valve units, generally designated 28 and 29, which, in turn, are mounted on retrievable hydraulic line connectors 30 and 31. The units 30 and 31, as better shown in FIG. 3, are illustrated and claimed in detail in the above-mentioned copending application. Two operating (i.e., pilot controlled) fluid lines 32, 33, 34, and 35 extend from the hydraulic line connector units 30 and 31 to upper blowout preventer 13, while other such operating fluid lines are suggested at 36, 37, 38, and 39 for controlling the plunger-type blowout preventers.

FIGS. 3–7 illustrate in greater detail the operatively-assembled connector unit 31 and the associated pilot valve unit 29. The other connector unit 30, shown disassembled in FIG. 1, and pilot unit 28 are structurally identical, and only units 29 and 31 will be described. Diagrammatic FIGS. 5, 6, and 7 show a manual control valve 42 mounted on a convenient panel 42a at the surface for controlling the application of pressured fluid, as from an hydraulic line 43, through pilot control fluid lines 44, 44a, 45, and 45a included in the hose bundle 23 for actuating correlated pair of pilot valves, as will be explained. Also extending through the hose bundles are operating fluid lines, as 46, one for each pilot valve unit. All of the controlling fluid pipes 44, 44a, 45, and 45a and controlled fluid line 46 in a single hose bundle terminate in a hose bundle connector unit, as 27, of known design and, in general, including interfitting elements for connection with a complementary pad 47 on a casing 48 which encompasses the pilot valve unit, generally designated 49. Pilot valve body block 49a is supported from cable 25 by means of a tension connector rod 54 having an eye 55 and, on its lower surface, has projecting bosses, as at 56 and 57, for interfitting with appropriately-positioned countersinks on the upper surface of a plate 58 on top of retrievable hose line connector unit 31. The pilot block 49a is secured to plate 58 by through bolts 59.

Retrievable hose connector unit 31 (FIG. 4) comprises an inner stinger or spear member 60 through which extend passages, as 61 and 62, from connector bosses 56 and 57 to annular grooves, as 63 and 64, in the tapered outer wall of member 60, for registering with ports, as 65 and 66, in the tapered inner wall of outer member 67 of the connector unit. Both members of the connector unit are encompassed by a skirt element 68. At the bottom of the assembled connector unit is a connector plate 69 with which tubes or hose lines, as 70, 71 and 32, 35 (FIG. 4) connect. Suitable latching means (not shown) are provided, as better explained in said above-mentioned copending application, for detachably securing together the inner and outer members 60 and 67 of the retrievable connector unit.

Pilot valve body 49a is conveniently made from a machined metal block having a central orifice 72a in which is sealingly received a sleeve 72b with a flange 72 resting on the top wall of the block. Apertures 73 are formed in flange 72 for bolts 59 and a central aperture 74 accommodates a tension bolt 54. Bolts 59 extend entirely through body 49a and are threaded into upper plate 58 on the connector unit inner member 60, as indicated at 75.

Surrounding sleeve 72b are an equally distributed annular series of eight bores 76–83 (FIG. 2) receiving the pilot valve assemblies. All of the pilot valve units are structurally identical and only the one in bore 76 (FIG. 3) will be here described. Near its lower end, bore 76 is reduced to form an annular shoulder 84 and a reduced passage portion 85 in which, in turn, there is provided a countersink 86 forming a downward shoulder 87. Lodged in countersink 86 is previously-mentioned boss 56 which interconnects passage 85 and cylinder 76 with passage 62 in plate 58 and connector inner member 60. Sealingly lodged in bore 76 against an intermediate shoulder 90 therein is a bushing 91 forming a pilot valve chamber 92. Reciprocably received in chamber 92 is the annular collar portion 93 of a plunger-type pilot valve 94 having a central axial orifice 95. Pilot valve 94 is normally urged downwardly by spring means such as a Belleville type spring washer 96. Stacked above bushing 91 are a ring 96a and a plug 97, the latter being removably secured in position as by a split ring 98. A pair of vents 99 are provided in plug 97.

Bushing 91 has peripheral grooves 91c and 91d in its outer surface communicating through ports 100 and 101 with the opposite ends of valve chamber 92. These grooves are connected by means of radial passages 102 and 103 with fittings in the outer wall of the valve block for attachment of pilot controlling lines 104 and 105 leading to hose bundle connector unit 27. Each pilot valve chamber communicates with a pair of radial pilot controlling passages, as shown in FIG. 3, the controlling passages for correlated valve chamber 92a (FIG. 3) being designated 102a and 103a and connecting with hose or tube sections 104a and 105a leading to connector unit 27.

Also extending radially through valve block 49a into the lower part of valve chamber 76 is a pilot-controlled passage 108 to which is connected operating fluid tube 109 from bundle connector block 27. Passage 108 is connected by means of an annular manifold passage 109a and other radial passages, as 108a in FIG. 3, to the lower portions of all of the pilot valve bores. These controlled operating fluid passages 109a, etc., communicate with the pilot valve bores below bushings 91 therein so that controlling of the pilot valves is isolated from the controlled fluid pressure. At the bottom of each pilot valve bore there is provided a seat block 111 bearing a resilient annular valve seat element 112 with which the annular valving element 113 at the lower end of the pilot slide valve 94 cooperates, as will be explained. Valve seat block 111 is suitably secured in position as by a split ring 114. Lodged in the under surface of removable top plug 97 is a resilient valve seating disc element 115. The annular upper end 116 of pilot valve 94 forms a valve element which cooperates with seating element 115.

Due to the interposition of the pilot valves between control valves 42 and their controlled functions, only relatively small pilot control hoses need be provided and, since only a single operating fluid duct extends to each pilot unit, the bulk of hose bundles 23, etc., is thereby reduced. Another important advantage of this design is the relative ease, simplicity, and inexpensiveness of pilot inspection, repair, and replacement. To gain access to the pilot valve, it is only necessary to remove split ring 98 and plug 97 at the upper end of bore 76, which permits withdrawal of Belleville spring washer 96, ring 96a, bushing 91, and slide-type pilot valve 94. Also, lower valve seat ring 111 may be removed at the same time, upon removal of split ring 114. It will be understood that at least one pilot valve will be provided for each function, and two such valves, as shown in FIG. 3, will be required where opposing hydraulic pressures are required, as, for instance, for controlling a blowout preventer. Sufficient pilot valve units will be provided to service all of the powered wellhead functions. Also, more or fewer pilot valves may be provided in each unit block.

FIGS. 5, 6, and 7 represent diagrammatically the operation of a correlated pair of the pilot valves to control the application of operating hydraulic pressure (controlled pressure) from lines 46, 46a, and 46b to blowout preventer 13 and the alternate venting of said preventer. In FIG. 5, manual control valve 42 is adjusted to shift pilot valve 94 downwardly to cause valving elements 113 and 112, respectively, at the lower end of pilot valve 94 and in block III to sealingly engage. This cuts off communication between operating fluid line 46a and passages 85, 62, and 35 while venting the latter passages leading from one of the functions of blowout preventer 13 (FIG. 1), through axial orifice 95 in pilot valve 94 and vent ports 99 in plug 97. At the same time, pilot controlling line 45 is pressured and its paired line 45a is vented in a manner to shift opposite pilot valve 94a upwardly to cause valving elements 116a and 115a, respectively, at the upper end of pilot valve 94a and in plug 97a to sealingly engage. Valving element 113a at the lower end of pilot valve 94a separates from valve seating element 112a so as to communicate operating pressure from hydraulic line 46b with passages 85a, 61, and 32. The closing of upper valve element 116a against seat 115a cuts off exhaust ports 99a from the hydraulic system.

In FIG. 6, valve 42 has been shifted to reverse pilot valves 94 and 94a, thus exposing ducts 85, 62, and 35 to the operating hydraulic pressure, while exhausting opposite function passages 85a, 61, and 32. In FIG. 7, all of the related pilot controlling lines 44, 44a, 45, and 45a are vented, which permits Belleville spring washers 96 and 96a to shift pilot valves 94 and 94a downwardly to cut off operating pressure from both function line hose sections 35 and 32, while venting both of these lines through plug vents 99 and 99a.

All of the pilot valves in the body block 49a operate in a similar manner to control the application of hydraulic operating pressure to or the venting of a wellhead function. It is significant that when a valve element 113 or 116 is closed against its seating element 112 or 115, its valving function is performed entirely by confronting axially movable seating elements and sealing elements in shear are avoided. Consequently, the problem of tight sealing of the valve is much simplified. Other advantageous features are small size, compactness, ruggedness, and inexpensiveness of the pilot valve unit. Prior art pilot valve assemblies for comparable purpose have required very much greater space than the present unit, one such prior art pilot valve arrangement being substantially three feet in height and twenty-four inches in diameter, whereas the present device occupies only one-half foot of height and fourteen inches of diameter. Thus, it is very much easier with the present device to prevent the projection of the pilot valve and connector parts above the wellhead and, thereby, avoid the danger of damage to the pilot valve due to swinging of parts which are lowered on the guide cables 16 and 17. Moreover, the present pilot valve arrangement costs substantially less than rior devices for the same purpose, the present device costing in the neighborhood of $20.00 while the mentioned prior device costs up to $170.00. Finally, the assembly and disassembly of the novel pilot valve unit is greatly simplified.

In the modification shown in FIG. 8, the lower valving element of the pilot valve is constructed as shown at 113b. The bottom face 120 of the valve is countersunk, as at 121, and chamfered, as at 122, for sealingly engaging corner 123 in the seating block 111b in case of damage to seating insert 112b.

What is claimed is:

1. The combination of sub-sea wellhead instrumentalities, fluid motor control means therefor, a remote control valve for said motor means, fluid lines extending from said control valve, and means for connecting said lines to said motor means including a pilot valve support, of a pilot valve unit comprising a body block mounted on said support, sai dblock having opposing end walls and a side wall, a plurality of valve chambers in said block, slide valves in said chambers, controlled fluid and pilot controlling fluid ports in the wall of each chamber and connecting passages therefor, means connecting said passages to said fluid lines and said motor means, and means securing said valve block to said support.

2. The combination specified in claim 1 in which all of said chambers open through one of said end walls and are provided with removable closure plugs facilitating installation and removal of said slide valves.

3. The combination described in claim 1 further including cooperating fluid line connector and guide elements on said valve block and said support.

4. The combination described in claim 1 further including a housing received about said valve block and secured to said support, multiple hose connector means between said lines and said housing, tube means inside said housing for connecting said connector means and said valve block, and fluid line connector means between said valve body block and said support.

5. In combination, fluid pressure apparatus for operation submerged, remote control means for said apparatus a plurality of control ducts extending between said mean and said apparatus, multiple conduit connect and disconnect coupling means interposed in at least some of said ducts, and a plurality of pilot valve devices also interposed in said ducts, each of said devices comprising a body with a valve chamber, a pilot valve reciprocable in said chamber, means biasing said valve in one direction, pilot-controlling ports in the side wall of said chamber connected to certain of said ducts, and pilot-controlled ports also in said chamber walls and connected to others of said duc for controlling said apparatus.

6. The combination described in claim 5 in which said apparatus comprises sub-sea wellhead equipment and i which all of said pilot valves are mounted compactly a< jacent said connect and disconnect coupling means.

7. The combination described in claim 6 in which a of said pilot valve devices are mounted in a common bod block having removable plugs in one face thereof to facil tate access to said valve devices.

References Cited

UNITED STATES PATENTS

| | | | |
|---|---|---|---|
| 609,089 | 8/1898 | Dutton | 137—625.6 |
| 1,233,052 | 7/1917 | Haiss | 137—596.1 |
| 2,467,533 | 4/1949 | Martin | 137—596.1 |
| 2,567,073 | 9/1951 | Kupiec | 137—596.1 |
| 2,630,828 | 3/1953 | Bent | 137—596 X |
| 2,990,851 | 7/1961 | Jackson et al. | 137—59 |
| 3,107,692 | 10/1963 | Forwald | 137—625.6 |
| 3,196,896 | 7/1965 | Leutenegger | 137—596.15 X |
| 3,280,908 | 10/1966 | Todd | 166— |
| 3,283,779 | 11/1966 | Rosaen | 137—596.1 |

HENRY T. KLINKSIEK, Primary Examiner

U.S. Cl. X.R.

91—461; 137—596, 625

PO-1050
(5/69)

UNITED STATES PATENT OFFICE
CERTIFICATE OF CORRECTION

Patent No. 3,460,614      Dated August 12, 1969

Inventor(s) Harry Lee Burgess

It is certified that error appears in the above-identified patent and that said Letters Patent are hereby corrected as shown below:

Column 2, line 65, the article -- a -- should be inserted after "actuating". Column 4, line 40, "III" should be -- 111 --. Column 5, line 13, "rior" should be -- prior --; line 25, "of" should be -- with --.

SIGNED AND
SEALED
APR 7 1970

(SEAL)
Attest:

Edward M. Fletcher, Jr.
Attesting Officer

WILLIAM E. SCHUYLER, JR.
Commissioner of Patents